United States Patent Office 3,514,382
Patented May 26, 1970

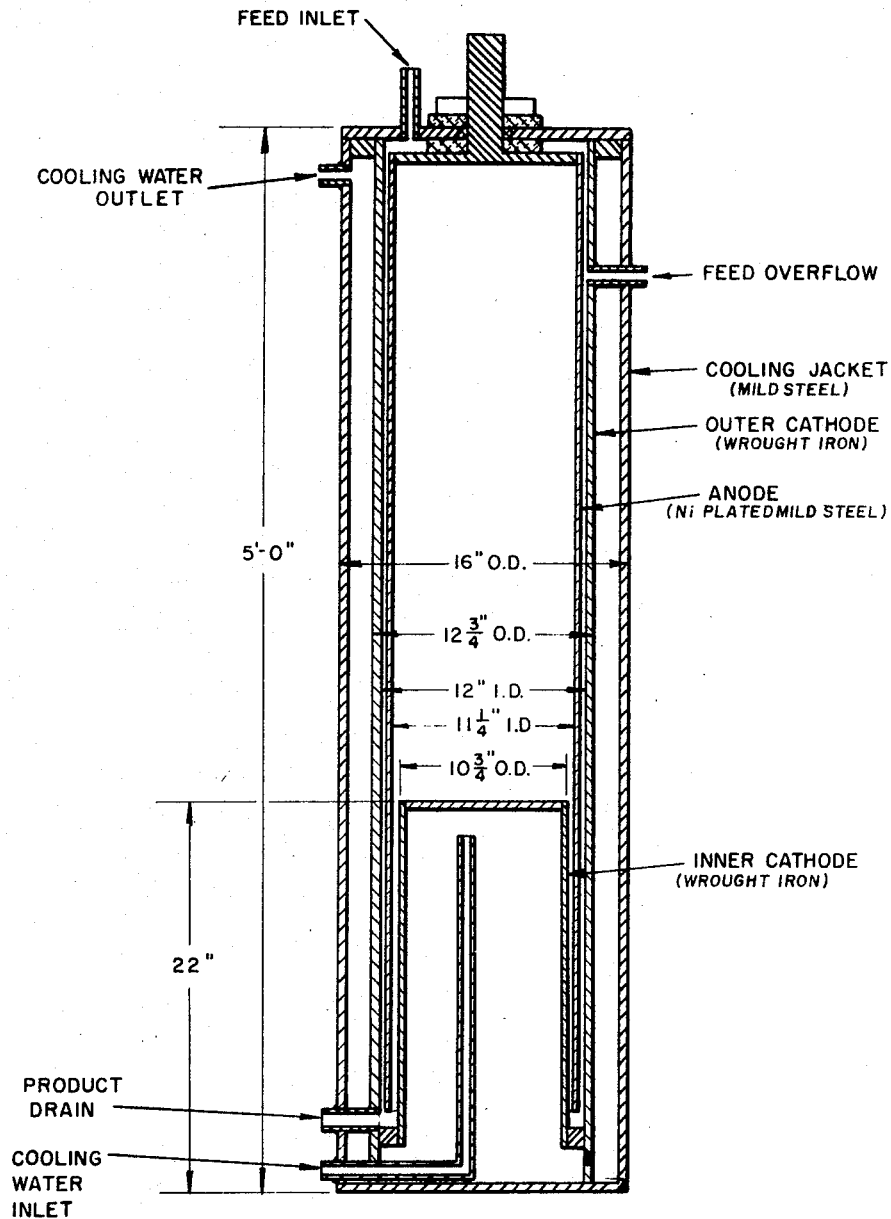
ELECTROLYTIC CELL

3,514,382
ELECTROLYTIC PROCESS FOR HEAVY WATER PRODUCTION
William Harmer Stevens, Deep River, Ontario, Canada, assignor to Atomic Energy of Canada Limited, Ottawa, Ontario, Canada, a corporation of Canada
Filed Jan. 31, 1967, Ser. No. 612,886
Claims priority, application Canada, Feb. 16, 1966, 952,421
Int. Cl. B01k 1/00; C01b 5/02; C02b 9/00
U.S. Cl. 204—101       22 Claims

ABSTRACT OF THE DISCLOSURE

A method of improving the efficiency of electrolytic processes for partially or completely separating deuterium oxide from water involving adding to the water or heavy water being electrolysed a small amount of a substance having one or more π-bonds, which is also polarizable and contains carbon and nitrogen.

BRIEF SUMMARY OF THE INVENTION

The present invention relates to a method of improving the efficiency of electrolytic processes for partially or completely separating deuterium oxide from water and electrolytic cells and solutions for use in the said process. More particularly the invention relates to an improved process for increasing the proportions of deuterium oxide in water by the electrolysis of an aqueous electrolyte containing a substance having one or more π-bonds which is polarizable and contains carbon and nitrogen. Preferred substances wherein this broad class are imidazole and substances of the general formula $$\underset{\underset{X}{\parallel}}{H_2N-C-Y} \qquad (I)$$

wherein X is an oxygen or sulphur atom or an —NH-group and Y is a group having nitrogen or oxygen bonded directly to the carbon atom, and salts thereof.

BACKGROUND OF THE INVENTION

One of the more useful processes employed for concentrating the oxides of the heavier isotopes of hydrogen, i.e. deuterium and tritium, involves fractionation of water or heavy water by electrolysis of an aqueous electrolyte, usually an aqueous alkali. This method relies on the greater tendency of the lighter, rather than the heavier, isotopes to be liberated in the form of gas from the electrolyte by electrolysis. In this manner, as electrolysis of the electrolyte proceeds the proportion of deuterium and tritium oxides in the residual electrolyte progressively increases. However, since the amount of deuterium oxide present in ordinary water is considerably less than 0.1 percent the concentration of the deuterium oxide is a lengthy and costly procedure and the yield is extremely small, about 10,000 litres of ordinary water being necessary to produce about 0.3 litres of deuterium oxide.

The efficiency of this electrolytic process for producing pure deuterium oxide or for increasing the proportion of deuterium tritium oxides in water is dependent to a considerable degree on a factor called the separation factor ($\alpha$). This separation factor $\alpha$ is the relationship between the gaseous and liquid phases which is expressed as follows:

$$\alpha = \frac{H/D \text{ gas}}{H/D \text{ liquid}}$$

It is well known that $\alpha$ is dependent on the combination of electrodes and electrolytes used. Up to the present time a value of $\alpha$ from about 8 to 10 has been the best attainable for any reasonably long production period, using mild steel cathodes in a caustic electrolyte, such as sodium hydroxide, potassium hydroxide or potassium carbonate. Hence it can be readily appreciated that even slight improvements in the value of $\alpha$ will be of economic importance in the production of both heavy water and substantially pure deuterium oxide.

TECHNICAL DISCLOSURE OF THE INVENTION

By the present invention, it has been found that by adding a substance having one or more π-bonds, which is also polarizable and contains carbon and nitrogen to the electrolyte, $\alpha$ can be increased by as much as 20 to 25 percent to a value of between 12.0 to 12.5 thus materially improving the efficiency of the process and increasing the yield of deuterium oxide from a given quantity of ordinary or heavy water. Hence it has been found that by electrolysing aqueous solutions containing polarizable substances such a ionisable cyanides, for example alkali and alkaline earth metal cyanides such as potassium caynide, benzotriazole, pyrazole, diphenylamine, pyridine, aniline, imidazole and substances of general Formula I and salts thereof $\alpha$ can be increased from 10 to 25 percent when compared with the higher values previously attainable. As would be expected by those skilled in the art the aforementioned substances are not equally effective in increasing $\alpha$. Hence it has also been found that the electrolytic process is most efficient and especially high yields of deuterium oxide are obtained when imidazole or compounds of Formula I or acid addition salts thereof are added to the electrolyte and hence the use of such compounds is a preferred embodiment of this invention. Specific compounds which have been found to give very good results are imidazole, urea, guanidine, thiourea, biuret, guanylurea, dicyanidiamide, urethane, biurea, semi-carbazide and acid addition salts thereof.

It is believed that the mechanism of the additive action involves chemisorption of the additive on certain active sites of the cathode surface. Presumably this is the reason why the additives to be effective must be polarizable and have at least one π-bond in their structure. The entire surface of the cathode must not be covered since less active sites must be left on which water is adsorbed. The reason for the improment in $\alpha$ is apparently due to the fact that the active compounds are adsorbed on the metal cathode. The adsorbed layers serve to alter the overvoltages for the hydrogen and deuterium evolution reactions, and more particularly the difference in overvoltages at the cathode, which leads to a higher separation factor.

To produce these beneficial results of this invention due to the improvement in the separation factor $\alpha$ it is only necessary to add a minute quantity of a compound as hereinbefore defined to the electrolyte, and effective amount being in the range of from about 3 to about 10 parts per million.

Although a wide range of electrolytes may be employed in the practice of this invention it is preferable to employ an alkali metal carbonate or hydroxide such as potassium carbonate or potassium or sodium hydroxide. It is particularly preferred to use potassium hydroxide as the electrolyte. The amount of electrolyte employed may be varied within fairly wide limits but it is preferable to give a concentration of about 3.5 to about 4.0 percent by weight dissolved in the water or heavy water.

The process of this invention may be effected in any conventional electrolytic cell using metal electrodes. However, it has been found according to a feature of this invention that the process may be most efficiently performed using electrodes of transition metals or alloys thereof, particularly iron or nickel or alloys of these metals. It is particularly preferred to use steel cathodes and nickel anodes.

The initial concentration of deuterium in the water electrolyzed is not important for the operation of the process of this invention. However, it has been found that for most economical operation of this process it is preferable to use feed water containing a deuterium/hydrogen ($D/H$) ratio of more than about 0.05.

Typical experiments illustrating the beneficial effect of representative compounds of Formula I on the separation factor $\alpha$ are set out below. These examples are provided by way of illustration only and are are not to be regarded as limiting the scope of the present invention.

Experimental procedure for investigating the improved electrolytic process for heavy water concentration An electrolytic cell of a type known as a "Concentration cell," illustrated in the attached figure, has been used in the experiments. This type of cell was used by the Consolidated Mining and Smelting Company at Trail, British Columbia, and by the Manhattan District Project at Morgantown, W. Va., to concentrate heavy water. The cell is described by P. J. Selak and J. Finke in Chemical Engineering Progress, 50. 221(1954).

The auxiliary tanks are sized so that various amounts of water plus electrolyte and additive can be added to the cell. Early experiments showed that the separation factor was essentially independent of the amount of water in a batch, provided the inner cathode surface was covered, and independent of $D_2O$ concentration in the feed. To shorten the time required for individual experiments, one quarter to one half of a full charge of water was used. (A full charge is about 60 kg. of water.) The $D_2O$ concentration was normally about 99% by weight.

The cell is powered by a D.C. rectifier capable of supplying up to 1500 amperes at up to 6 volts.

Normal procedure for an experimental run was as follows:

(1) A weighed amount of water and the desired amounts of electrolyte, and additive if used, were placed in the feed mix tank.

(2) The tank contents were mixed, sampled for analyses, and run into the electrolytic cell.

(3) The current was turned on, the rectifier was adjusted to give the desired current density, and the electrolytic gas recombination unit was started.

(4) Electrolysis was allowed to proceed for a predetermined time, the total ampere-hours being recorded.

(5) The electrolyzed solution remaining in the cell was drained to a holding tank and sampled for analyses.

The separation factor for the experimental run was calculated using the formula:

$$\log \frac{W_o}{W_o - W} = \frac{1}{\alpha - 1} \left( \log \frac{X_o}{X} + \alpha \log \frac{1-X}{1-X_o} \right)$$

where $W_o$ = initial weight of water in the cell
$W$ = weight of water electrolyzed (calculated from the total coulombs passed through the cell)
$X_o$ = initial wt. percent $H_2O$ of water in the cell
$X$ = final wt. percent $H_2O$ of water in the cell
$\alpha$ = separation factor Typical data for experiments with and without additives are given below:

Run No. 3–41 (no additive)

$W_o$ = 24.962
$W_o - W$ = 19.292
$X_o$ = 1.58
$X$ = 0.20
Total ampere-hours = 15323
Average voltage = 2.85
Average current = 1020 amps
Average temp. of cell liquid = 13.8° C.
Wt. percent $K_2O$ in electrolyte = 3.02
Additive—none
Separation factor $\alpha$ = 9.52

Run No. 31–2 (no additive)

$W_o$ = 15.465 kg.
$W_o - W$ = 12.879 kg.
$X_o$ = 0.99
$X$ = 0.23
Total ampere-hours = 6990
Average voltage = 3.4
Average current = 760 amps
Average temp. of cell liquid = 4.8° C.
Wt. percent $K_2O$ in electrolyte = 1.7
Additive—none
Separation factor—$\alpha$ = 9.37

Run No. 31–44 (no additive)

$W_o$ = 15.456 kg.
$W_o - W$ = 13.098 kg.
$X_o$ = 1.0
$X$ = 0.274
Total ampere-hours = 6330
Average voltage = 3.5
Average current = 1050 amps
Average temp. of cell liquid = 16.4° C.
Wt. percent $K_2O$ in electrolyte = 1.86
Additive—none
Separation factor—$\alpha$ = 9.22

Run No. 17–3 (additive)

$W_o$ = 24.951
$W_o - W$ = 19.772
$X_o$ = 1.59
$X$ = 0.152
Total ampere-hours = 13998
Average voltage = 2.8
Average current = 1020 amps
Average temp. of cell liquid = 13.8° C.
Wt. percent $K_2O$ in electrolyte = 3.18
Additive—Urea, 100 mg.
Separation factor—$\alpha$ = 11.82

Run No. 25–1 (additive)

$W_o$ = 24.966 kg.
$W_o - W$ = 20.426 kg.
$X_o$ = 1.47
$X$ = 0.188
Total ampere-hours = 12148
Average voltage = 2.96
Average current = 1000 amps
Average temp. of cell liquid = 6.5° C.
Wt. percent $K_2O$ in electrolyte = 3.0
Additive—guanylurea sulphate, 100 mg.
Separation factor—$\alpha$ = 11.99

Run No. 33–6 (additive)

$W_o$ = 15.470 kg.
$W_o - W$ = 13.318 kg.
$X_o$ = 0.97
$X$ = 0.199
Total ampere-hours = 5821
Average voltage = 3.6
Average current = 930 amps
Average temp. of cell liquid = 7.7° C.
Wt. percent $K_2O$ in electrolyte = 1.7
Additive—guanidine carbonate, 240 mg.
Separation factor—$\alpha$ = 12.2

What I claim as my invention is:

1. A process for increasing the proportion of deuterium oxide in water which comprises electrolyzing water containing an electrolyte and a polarizable substance having at least one $\pi$-bond and containing carbon and nitrogen.

2. A process as claimed in claim 1 wherein the water electrolyzed is heavy water.

3. A process as claimed in claim 1 wherein the electrolyte is an alkali metal carbonate or hydroxide.

4. A process as claimed in claim 1 wherein the water being electrolyzed contains an electrolyte and a substance selected from ionisable cyanides and benzotriazole, pyrazole, diphenylamine, pyridine, aniline, imidazole and substances of the general formula

wherein X is an oxygen or sulphur atom or an —NH- group and Y is a group having nitrogen or oxygen bonded directly to the carbon atom, and salts thereof.

5. A process as claimed in claim 1 wherein the water being electrolyzed contains an electrolyte and a substance selected from soluble cyanides of alkali and alkaline earth metals and benzotriazole, pyrazole, diphenylamine, pyridine, aniline, imidazole, and substances of the general formula

wherein X is an oxygen or sulphur atom or an —NH- group and Y is a group having nitrogen or oxygen bonded directly to the carbon atom, and salts thereof.

6. A process for increasing the proportion of deuterium oxide in water which comprises electrolyzing water containing an electrolyte and imidazole or an acid addition salt thereof.

7. A process as claimed in claim 6 wherein the water electrolyzed is heavy water having a deuterium/hydrogen ratio of more than about 0.05.

8. A process for increasing the proportion of deuterium oxide in water which comprises electrolyzing water containing an electrolyte and a substance of the general formula

or an acid addition salt thereof, wherein X is an oxygen or sulphur atom or an —NH-group and Y is a group having nitrogen or oxygen bonded directly to the carbon atom.

9. A process as claimed in claim 8 wherein the water electrolyzed is heavy water having a deuterium/hydrogen ratio of more than about 0.05.

10. A process as claimed in claim 8 wherein the electrolyte is an alkali metal carbonate or hydroxide.

11. A process as claimed in claim 8 wherein Y is —NH$_2$, —NHNHCONH$_2$, —NHNH$_2$, —NHCN, OC$_2$H$_5$ or —NHCONH$_2$.

12. A process as claimed in claim 8 wherein the substance of formula I is urea, guanidine, thiourea, biuret, guanylurea, dicyandiamide, urethane, biurea or semicarbazide or an acid addition salt thereof.

13. A process as claimed in claim 8 wherein the electrolyte is sodium hydroxide, potassium hydroxide or potassium-carbonate and the substance of Formula I is urea, guanidine, thiourea, biurea, guanylurea, dicyandiamide, urethane, biurea or semicarbazide or an acid addition salt thereof.

14. A process as claimed in claim 8 wherein the electrolysis is effected in an electrolytic cell having electrodes of a transition metal or an alloy thereof.

15. A process as claimed in claim 8 wherein the electrolysis is effected in an electrolytic cell having electrodes of iron or nickel or an alloy thereof.

16. A process as claimed in claim 8 wherein the electrolysis is effected in an electrolytic cell having steel electrodes.

17. A process for increasing the proportion of deuterium oxide in water which comprises electrolysing water containing sodium hydroxide, potassium hydroxide or potassium carbonate as an electrolyte and urea, guanidine, thiourea, biurea, guanylurea, dicyandiamide, urethane, biurea or semicarbazide in an electrolytic cell having steel electrodes.

18. A process as claimed in claim 17 wherein the water contains from about 3.5 to about 4.0 percent of electrolyte and from about 3 to about 10 parts per million of urea, guanidine, thiourea, biurea, guanylurea, dicyandiamide, urethane, biurea or semicarbazide.

19. A process for increasing the proportion of deuterium oxide in water having a deuterium/hydrogen ratio of more than about 0.05 which comprises electrolyzing water containing sodium hydroxide, potassium hydroxide or potassium carbonate as an electrolyte and guanidine or an acid addition salt thereof in an electrolytic cell having steel electrodes.

20. A process for increasing the proportion of deuterium oxide in water having a deuterium/hydrogen ratio of more than about 0.05 which comprises electrolyzing water containing sodium hydroxide, potassium hydroxide or potassium carbonate as an electrolyte and imidazole or an acid addition salt thereof in an electrolyte cell having steel electrodes.

21. A process as claimed in claim 20 wherein the water contains from about 3.5 to about 4.0 percent of electrolyte and from about 3 to about 10 parts per million of guanidine, imidazole or an acid addition salt thereof.

22. An electrolytic solution which comprises an electrolyte and a polarizable substance having one or more $\pi$-bonds and containing carbon and nitrogen, dissolved in water having a deuterium/hydrogen ratio of more than about 0.05.

References Cited

UNITED STATES PATENTS

| | | |
|---|---|---|
| 2,690,380 | 9/1954 | Taylor. |
| 2,695,268 | 11/1954 | Wright _____ 204—101 |
| 3,256,163 | 6/1966 | Winsel et al. _____ 204—101 |
| 3,306,832 | 2/1967 | Lewis et al. _____ 204—101 |

JOHN H. MACK, Primary Examiner

D. R. JORDAN, Assistant Examiner

U.S. Cl. X.R.

204—149